United States Patent

Watanabe

[11] Patent Number: 5,623,708
[45] Date of Patent: Apr. 22, 1997

[54] AUTOFOCUS ADJUSTMENT DEVICE OF A CAMERA AND METHOD

[75] Inventor: Toshimi Watanabe, Yokohama, Japan

[73] Assignee: Nikon Corporation, Tokyo, Japan

[21] Appl. No.: 517,973

[22] Filed: Aug. 22, 1995

[30] Foreign Application Priority Data

Sep. 7, 1994 [JP] Japan .................... 6-214116

[51] Int. Cl.$^6$ .................................... G03B 3/00
[52] U.S. Cl. ............................. 396/153; 396/87
[58] Field of Search ............................. 354/402

[56] References Cited

U.S. PATENT DOCUMENTS

| | | |
|---|---|---|
| 4,860,045 | 8/1989 | Hamada et al. . |
| 4,967,224 | 10/1990 | Hamada et al. . |
| 4,969,003 | 11/1990 | Ohnuki et al. ............. 354/402 |
| 4,974,002 | 11/1990 | Ohnuki et al. ............. 354/402 |
| 5,012,267 | 4/1991 | Higashihara ............. 354/402 |
| 5,189,459 | 2/1993 | Watanabe et al. ............. 354/402 |
| 5,208,625 | 5/1993 | Suekane ............. 354/402 |
| 5,293,193 | 3/1994 | Okano et al. ............. 354/400 |
| 5,311,241 | 5/1994 | Akashi et al. ............. 354/402 |
| 5,434,638 | 7/1995 | Ishibashi et al. ............. 354/400 |
| 5,444,510 | 8/1995 | Okano et al. ............. 354/400 |
| 5,448,329 | 9/1995 | Nakata ............. 354/402 |
| 5,510,874 | 4/1996 | Kusaka et al. ............. 354/402 |

FOREIGN PATENT DOCUMENTS

| | | |
|---|---|---|
| 62-125311 | 6/1987 | Japan . |
| 62-139511 | 6/1987 | Japan . |
| 2-50140 | 2/1990 | Japan . |
| 5-107455 | 4/1993 | Japan . |

OTHER PUBLICATIONS

Abstract of Japanese Unexamined Patent Application No. Hei 5-107455.
Abstract of Japanese Unexamined Patent Application No. Hei 2-50140.

Primary Examiner—Safet Metjahic
Assistant Examiner—Michael Dalakis
Attorney, Agent, or Firm—Oliff & Berridge

[57] ABSTRACT

A camera includes an autofocus adjustment device. The autofocus device comprises a lens and camera body. The lens is comprised of a shooting lens, a lens information circuit, and a lens movement mechanism. The camera body has a main mirror, a submirror, an AF module, a sensor drive circuit, a controller, a lens drive control circuit, and motor. The autofocus adjustment device uses image plane movement velocity for the determination of a moving object and uses focus position change velocity in lens drive control.

21 Claims, 11 Drawing Sheets

AUTOFOCUS ADJUSTMENT DEVICE OF A CAMERA AND METHOD

BACKGROUND OF THE INVENTION

1. Field of the Invention

The present invention relates to an autofocus adjustment method and a corresponding device for a camera. The autofocus adjustment method and device can accurately focus on a moving object.

2. Description of Related Art

Autofocus devices are known, such as in Japanese Unexamined Patent Applications Hei 2-50140 and Hei 5-107455, which can calculate the image plane movement velocity. The lens movement amount for a lens control is calculated from the image plane movement velocity. Additional autofocus devices are known, such as in Japanese Unexamined Patent Applications Sho 62-125311 and Sho 62-139511, which can determine the movement of an object from the lens movement amount change.

The image plane's movement velocity indicates the image plane's position velocity change, if the lens is fixed. If the lens is not fixed but varies, the image plane's movement velocity varies. Errors can occur when the image plane's movement velocity is converted by a defocus amount lens movement amount conversion coefficient for moving the lens to focus. Also, the determination whether a body is moving, from the change in the lens movement amount, does not provide an accurate determination of the body's status because lens movement amount varies according to the lens focus adjustment process.

SUMMARY OF THE INVENTION

The present invention uses an image plane movement velocity, which does not rely on the lens' velocity, for determining whether a body is moving. The image plane movement velocity that determines the lens movement amount to control the lens is calculated from pulses used to calculate the lens movement amount, rather than reversing the image plane movement velocity by the defocus amount lens movement amount conversion coefficient, as conventionally calculated. In other words, the invention uses an encoder pulse, which corresponds to the lens forwarding amount, to calculate the future predicted position of the moving object.

The invention can also be utilized with lenses that have a changeable defocus amount lens movement amount conversion coefficient. This is because the invention does not use an image plane movement amount calculated from the moving body determination to control the lens drive.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

The invention will be described in detail with reference to the following drawings in which like reference numerals refer to like element and wherein.

DETAILED DESCRIPTION OF PREFERRED EMBODIMENTS

Figure 6:
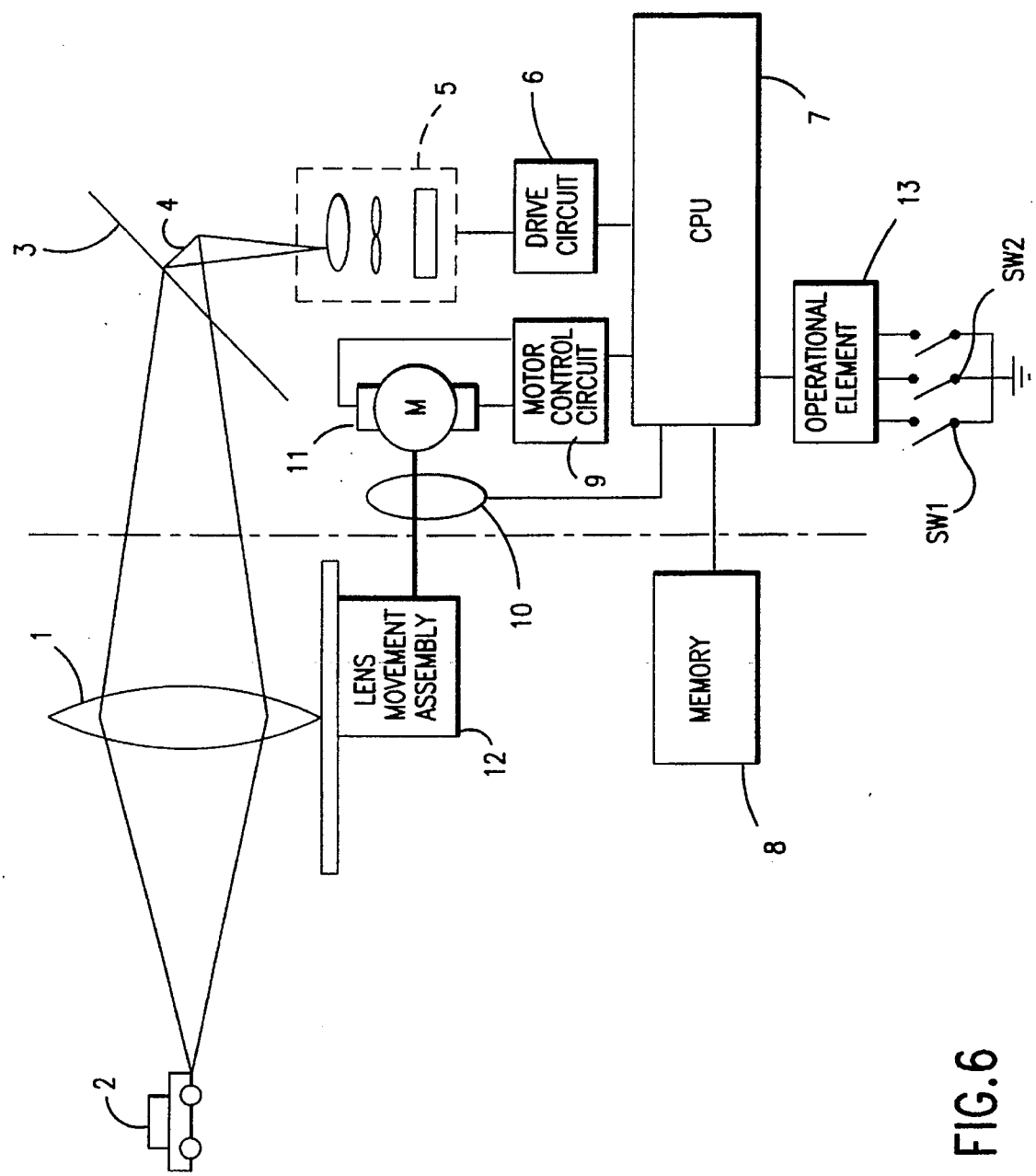
FIG. 6 is a schematic diagram showing the structure of a camera with the autofocus adjustment device.

A camera with an autofocus adjustment mechanism according to one preferred embodiment of the invention is schematically shown in FIG. 6. A portion of the light reflected from an object 2 passes through the shooting lens 1 and is guided by main mirror 3 and submirror 4 to an autofocus module 5. The reflected light is then converted by the autofocus module 5 into an electric signal. Autofocus module 5 may take any known form for a focus detection device, which includes a reimaging optical system and sensor.

Autofocus module 5 is controlled by a sensor drive circuit 6. The converted signal from autofocus module 5 is stored in an appropriate section inside a controller 7. In the illustrated embodiment, the controller 7 is implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 7, 8 and 13–15 can be used as the controller. As shown, a distributed processing architecture is preferred for maximum data/signal processing capability and speed.

Memory 8 stores lens-related information, such as the focus distance for the shooting lens 1 and a defocus amount lens drive amount conversion coefficient. The lens drive amount is calculated from the data stored inside controller 7 and the defocus amount lens drive amount conversion coefficient stored in the lens information memory 8.

A motor control circuit 9 interconnects a motor 11 to the controller 7. Controller 7 controls the amount of shooting lens drive for motor 11 based on a calculated lens drive amount. The drive power from motor 11 is transmitted to a lens movement assembly 12 to adjust the lens for focussing on the object.

An encoder 10 is operatively connected to the motor control circuit 9, motor 11 and lens movement assembly 12. The encoder 10 generates pulses indicating the lens drive position or lens drive amount. Controller 7 is connected to the encoder 10 through motor control circuit 9 and monitors the lens drive position or lens drive amount.

An operational element 13 comprises a plurality of switches, including SW1 (hereafter the "half-depression switch"), which begins the lens focus adjustment, and SW2 (hereafter the "fully-depressed switch"), which is activated with the second stroke of the half-depression switch. Operation of the switches in the operational element 13 initiates operation of the autofocus device.

The control of the camera and shooting lens is achieved by a control routine or program, such as software or the like, inside controller 7. The control routine will now be explained with reference to FIG. 7.

Figures 7, 8:
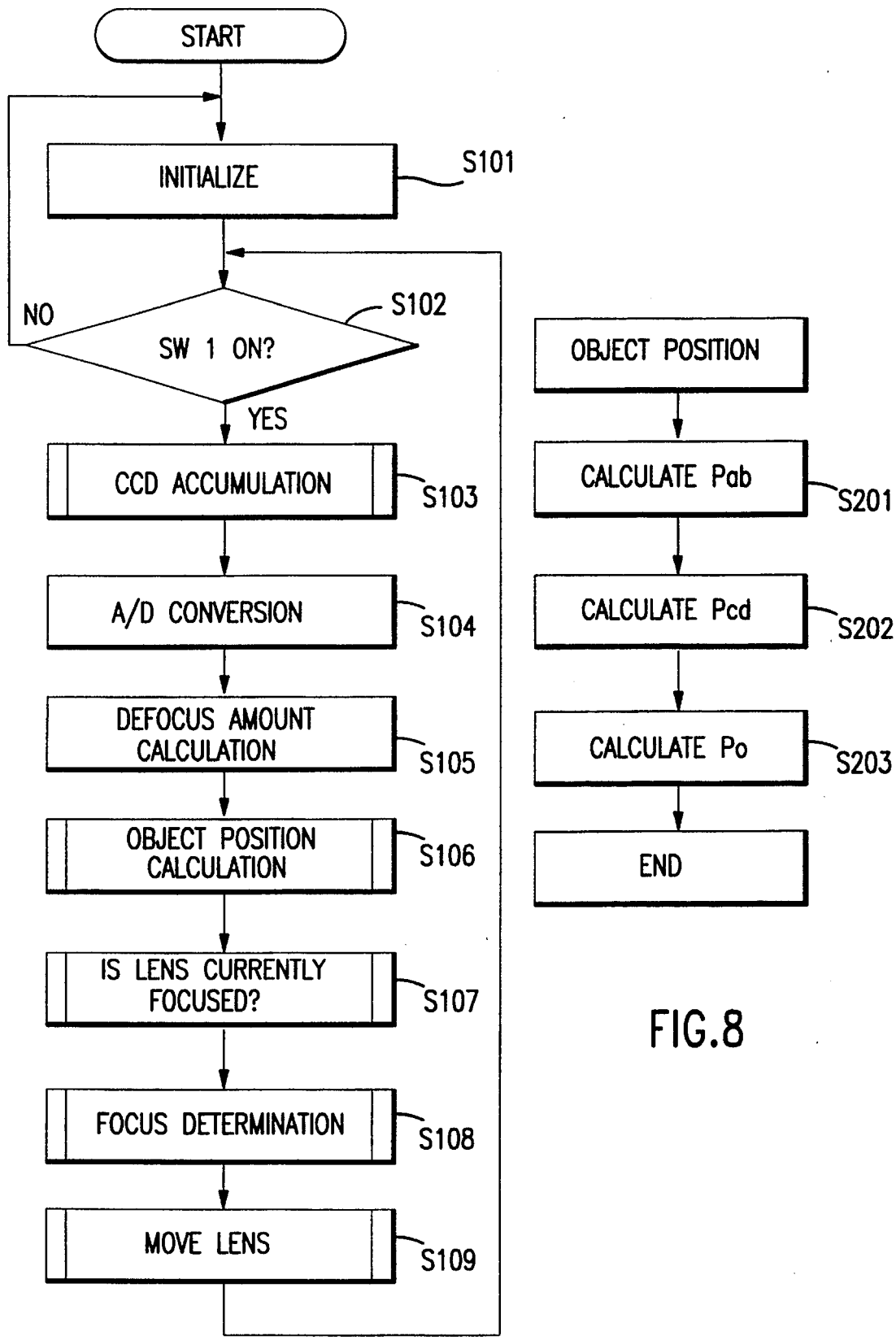
FIG. 7 is a main flow chart illustrating the control routine of the invention.
FIG. 8 is a flow chart illustrating the object position control subroutine according to the invention.

FIG. 7 is the main flowchart for the controller 7 for the autofocus device. In step S101, flags and memory amounts used in the autofocus adjustment process are initialized. Examples of these flags and memories comprise: previously detected defocus amounts; central timing of accumulation; moving object flag; focus flag; and the like. At step S102, the controller 7 determines whether the half-depression switch SW1 is "on". If the half-depression switch SW1 is not "on", the controller 7 returns to step S101. If half-depression switch SW1 is "on", the controller 7 proceeds to step S103.

Figure 4:
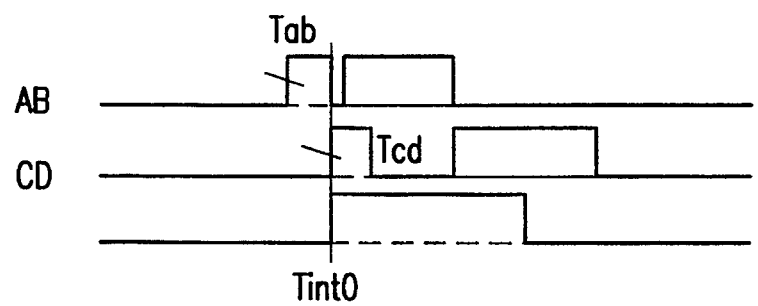
FIG. 4 is also a drawing showing accumulation timing for one preferred embodiment of the invention.
Figure 5:
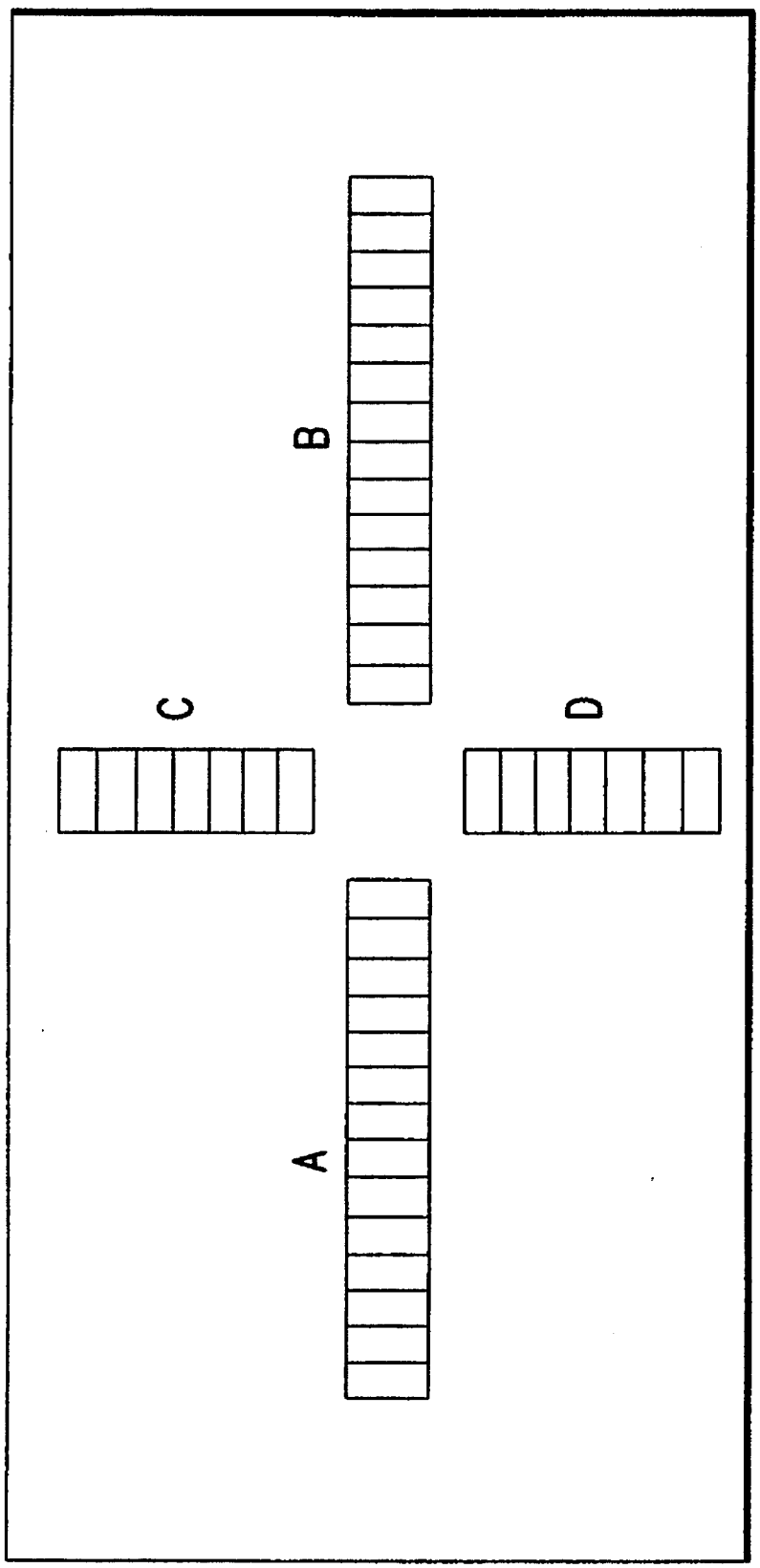
FIG. 5 is a drawing showing the arrangement of the sensors' photoelectric conversion elements.

At step S103 an accumulation control subroutine is executed. In the accumulation control subroutine, a CCD accumulation start/stop control for each of the sensor areas is performed. The accumulation average lens position for each sensor area is determined by monitoring the pulses from encoder 10, and a photoelectric analog signal is generated for each of the sensor areas. The sensors for the AF module 5 are arranged as shown in FIG. 4. In the accumulation control subroutine, accumulation time is controlled for both columns AB and CD.

After completion of the accumulation control subroutine in step S103, the controller 7 moves to step S104, where the analog signal from the accumulation control subroutine is A/D converted. The converted signal is then stored in a memory section of controller 7. After storing the converted signal, the controller 7 moves to step S105.

Step S105 represents any well-known defocus amount computation control subroutine. The defocus amount for each sensor area, AB and CD, is determined from the converted signal housed in the memory section. After the control subroutine of step S105 is complete, the controller 7 moves to step S106.

Step S106 is known control subroutine that determines the future movement of the object. The future movement is based on the defocus amount calculated in the defocus amount computation control subroutine of step S105 and previously stored focus detection information, such as defocus amount, average lens position, and central time of accumulation.

Step S107 represents a known control subroutine to determine whether the shooting lens is currently in a focused condition.

Step S108 represents a focus determination control subroutine to calculate lens drive amount. The control subroutine at step S108 also enacts the actual driving of the lens. The controller 7 moves from step S108 to step S109, which drives the lens.

The accumulation control subroutine at step S103 will be explained. The accumulation control subroutine controls the CCD accumulation start/stop in sensor areas AB and CD. The accumulation time for sensor areas AB and CD is set as Tab and Tcd, respectively. The accumulation times are determined from the previous accumulation times for each sensor and the sensor output for the previous accumulation time, known as "soft AGC" or auto gain control. The determination of the soft AGC is known in the art and it will not be explained here.

After the accumulation times have been determined, three conditions are possible with respect to a fixed value Tth and accumulation times Tab, Tcd.

Condition 1: Tab>Tth and Tcd>Tth

Condition 2: (Tab>Tth and Tcd>Tth) or (Tab<Tth and Tcd>Tth)

Condition 3: Tab<=Tth and Tcd<=Tth

Figure 1:
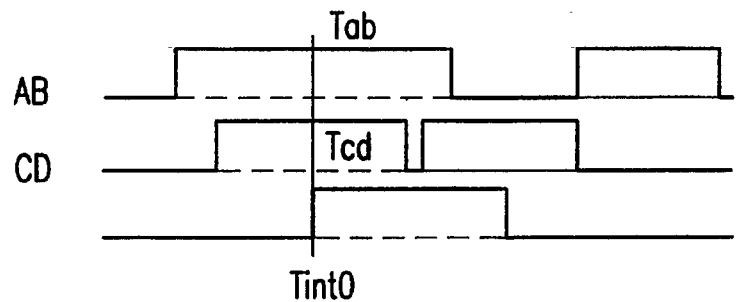
FIG. 1 is a drawing showing accumulation timing for one preferred embodiment of the invention.

In Condition 1, the accumulation cycle start and stop times for sensor areas AB and CD are set so the central time of accumulation each becomes Tint0. This is shown in FIG. 1.

Figure 2:
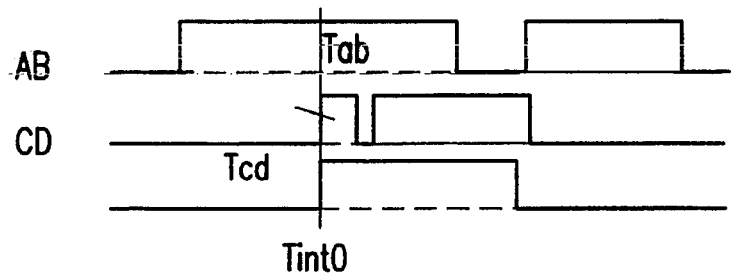
FIG. 2 is another drawing showing accumulation timing for one preferred embodiment of the invention.

In Condition 2, a accumulation time for Tab is longer than Tcd and the central time of accumulation for Tab becomes Tint0. The shorter accumulation start for Tcd is set so the central time of accumulation will be Tint0, as shown in FIG. 2. By doing this, control can be easily carried out for extremely short accumulation times. In FIG. 2, to simplify the explanation, the accumulation time for sensor area AB is shown longer than the fixed value Tth. When the accumulation time for sensor area CD is long, the accumulation time for sensor area AB should be started at the central time of accumulation for sensor area CD.

Figure 3:
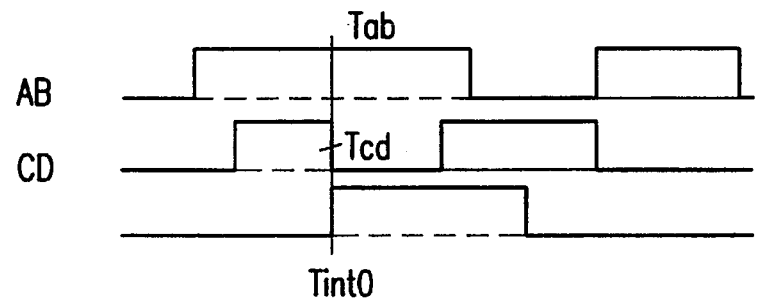
FIG. 3 is a further drawing showing accumulation timing for one preferred embodiment of the invention.

In Condition 2, the longer accumulation time Tab is set so the central time of accumulation becomes Tint0. Tcd is set with a short accumulation stop to equal the central time of accumulation Tint0 of Tab, as seen in FIG. 3. Therefore, control can be easily accomplished when accumulation time Tcd is extremely short, as in FIG. 2.

In Condition 3, accumulation for each sensor area is sequentially performed, because accumulation times Tab and Tcd for each sensor area are shorter than the fixed time Tth. This is shown in FIG. 3. By sequentially performing accumulation for each sensor area, control is simplified because, even though the central times of accumulation should be synchronized, when accumulation times are short, large errors do not arise, even if the scopes are slightly off. Additionally, in the accumulation control subroutine at step S103, a pulse from encoder 11 for the accumulation of each sensor area is counted to determine the average lens position during the accumulation. The sensor areas' average lens position LPab, LPcd for each is obtained. The central time of accumulation Tint0 is also the starting time for the transmission of lens information (such as defocus amount lens drive amount conversion coefficient, open F-value, etc.). Therefore, the lens must be ready to transmit information at time Tint0. Lens position LPint0 for the central time accumulation Tint0 is then recorded.

Figure 9:
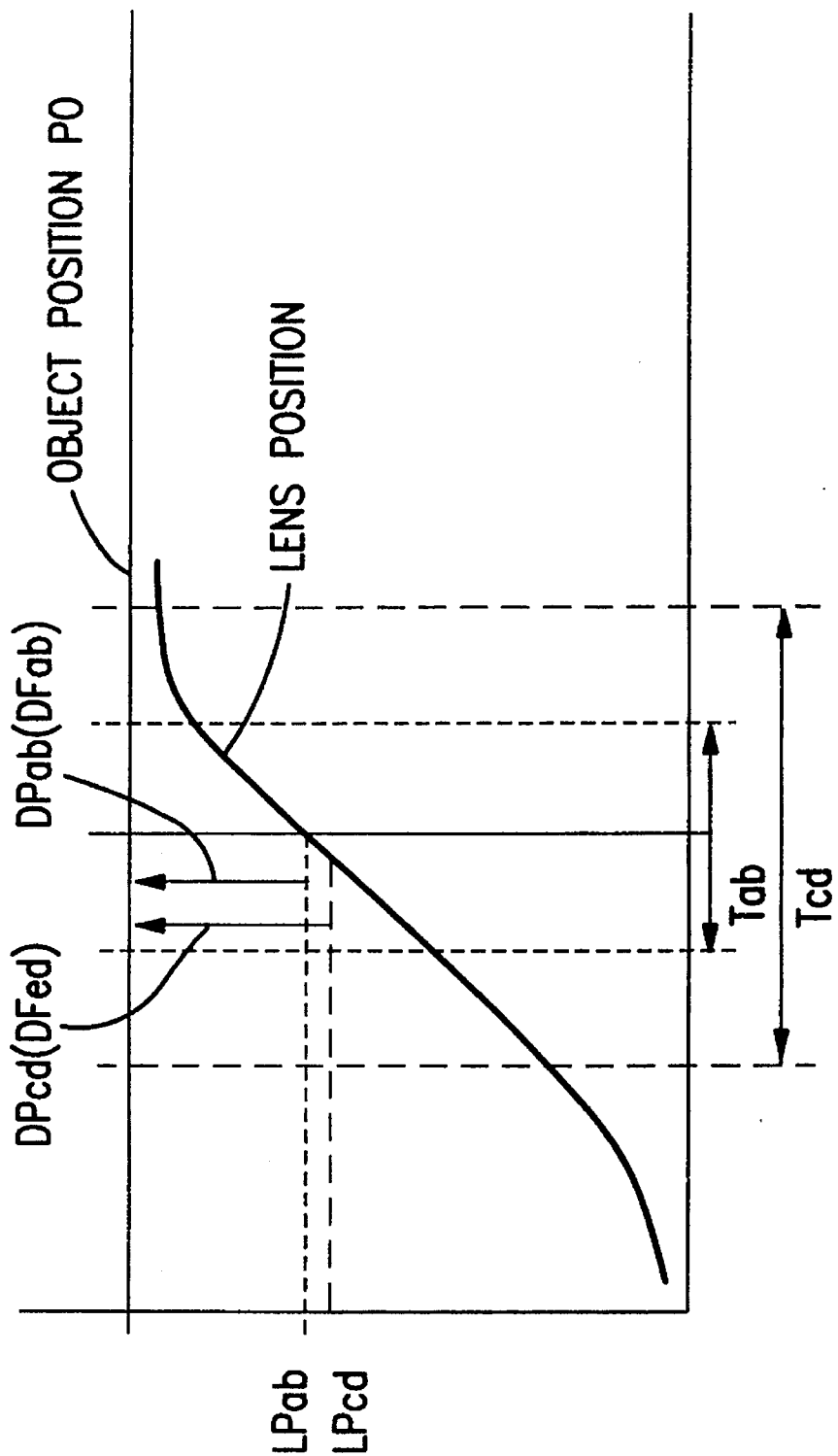
FIG. 9 is a graphical representation showing the compiling of multiple area detection defocus amounts.

The object target position calculation control subroutine of step S105 will now be described, with reference to FIGS. 8 and 9. To clarify and simplify the explanation, the graph of FIG. 9 presupposes the object to be stationary. Object target position P0 indicates object target position at the central time of accumulation Tint0.

Object target position P0 is calculated as follows. First, defocus amount DFab for sensor area AB is converted to the feedback pulse conversion's lens movement amount DPab using Equation (1).

$$DPab=KB*KL*\{DFab/(1-(L*DFab))\} \quad (1)$$

where defocus amount lens drive amount conversion coefficients, KL and L, are derived from the current cycle's center of the accumulation time, DFab is the unconverted defocus amount, and lens drive amount pulse conversion coefficient KB is a fixed value.

Similarly, the feedback pulse conversion lens drive amount DPad for sensor area CD is calculated using Equation (2).

$$DPcd=KB*KL*\{DFcd/(1-(L*DFcd))\} \quad (2)$$

where DFcd is the unconverted defocus amount.

The target object position of the sensor areas AB and CD cannot be calculated at this point because the calculated lens movement amount equals the lens movement amount taken from the average stored lens position for each area. However, the object target position, Pab and Pcd, for each sensor area can be determined in steps S201 and S202 by adding the stored average lens position values, LPab and LPcd, to the lens movement amounts DPab and DPcd. Thus, object target positions can be determined by the following formulae in Equation (3).

$$Pab=DPab+LPab \quad (3)$$
$$Pcd=DPcd+LPcd$$

The stored average lens positions LPab and LPcd will vary because the detected defocus amount is a relative amount, with respect to the average lens position. The lens thus moves at a uniform velocity during accumulation for each sensor area. The defocus amount will not be compiled for sensor areas where accumulation times vary and a proximity comparison will not be possible, except when the object is stationary.

The object target position P0, which includes the object target position for each area, can then be calculated in step S207 using Equation (4).

$$P0=\alpha*Pab+\beta*Pcd \quad (4)$$

where $\alpha$ and $\beta$ are weighing coefficients. Weighing coefficients $\alpha$ and $\beta$ can be changed according to various factors, such as the object contrast, object luminance, and accumulation time.

Figure 10:
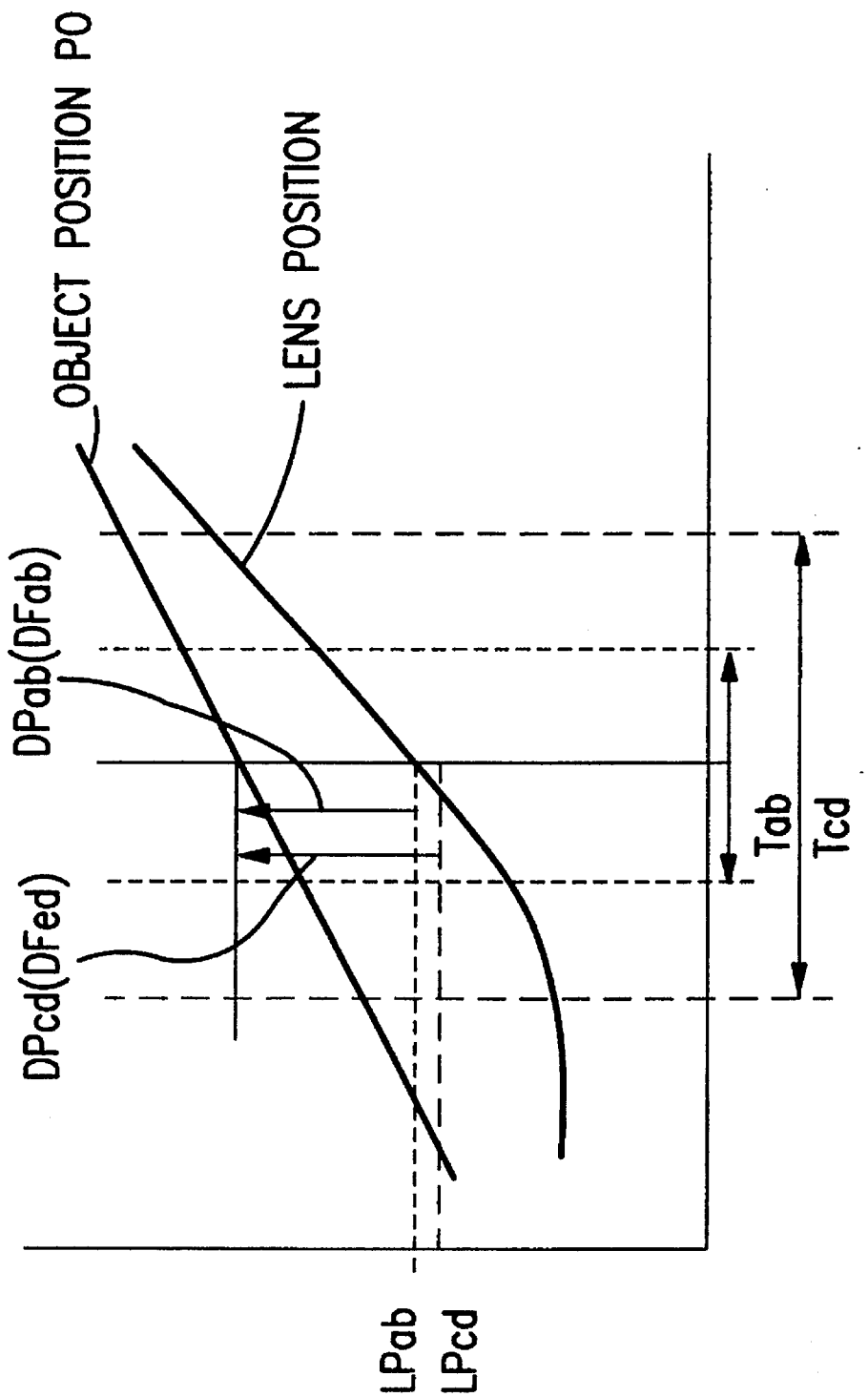
FIG. 10 is another graphical representation showing the compiling of multiple area detection defocus amounts.

FIG. 10 is a graph showing the lens forwarding amount versus time for a moving object. When the object position P0 movement is generally uniform during the accumulation, the stored average object position and object position at the central time of accumulation coincide. Therefore, the amount of stored data is reduced by combining the object positions at the central time of accumulation and stored average object position. However, if the accumulation time varies and a difference in the object position between the sensor areas occurs, it is difficult to determine if the difference was caused by object movement or because another object was detected.

Figure 11:
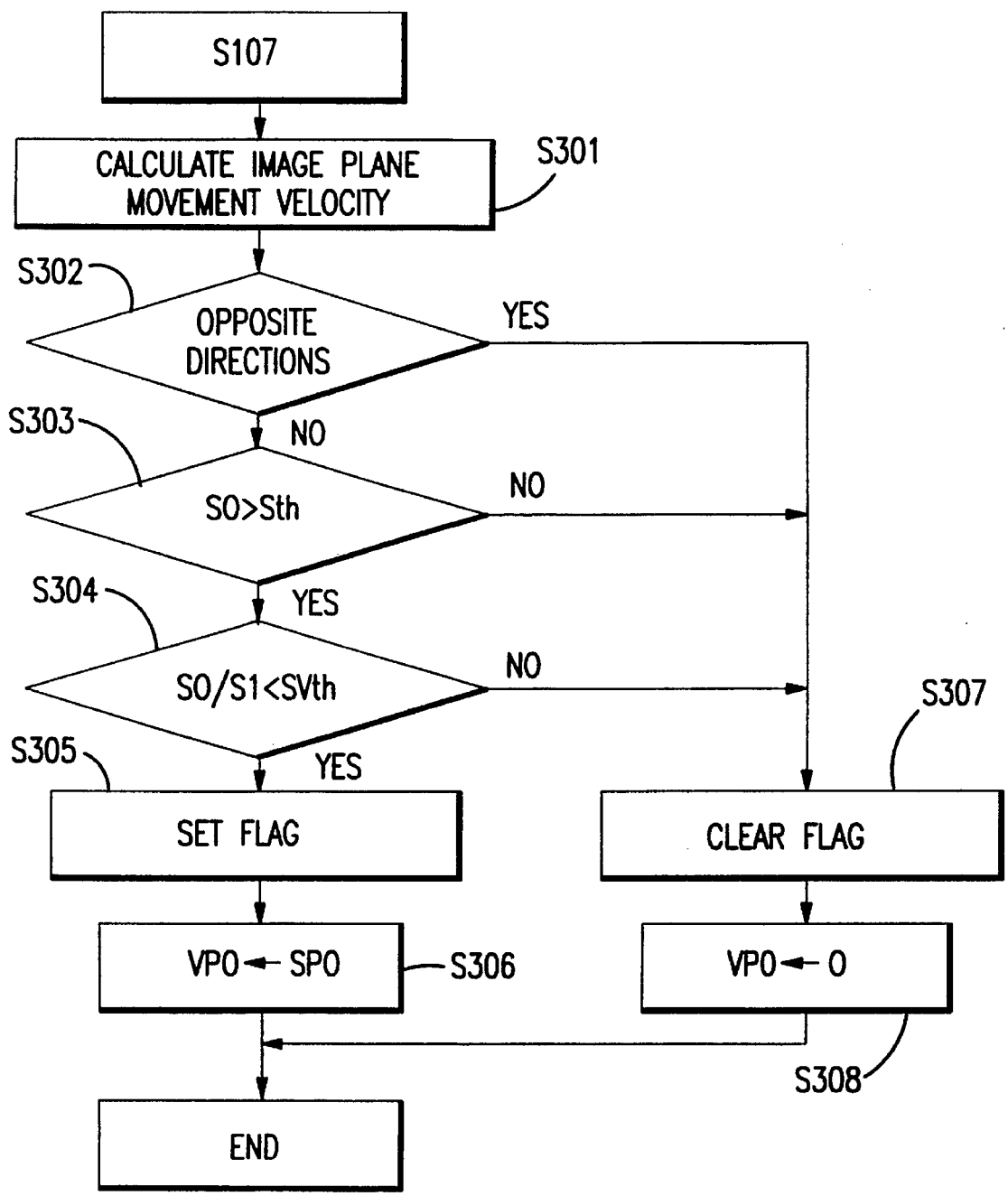
FIG. 11 is a flow chart showing the prediction calculation control subroutine according to the invention.

The prediction calculation control subroutine at step S107 for predicting the future movement of the object will now be explained with reference to FIG. 11. In step S301, the lens position velocity or focus change velocity needed for focusing on an object at various time intervals is calculated. The image plane movement velocity is used to determine if the object is focussed upon. The focus position image velocity is used in the lens movement control. Also, in step S301, the image plane movement velocity when the object is moving and the lens position is fixed is calculated.

Figure 12:
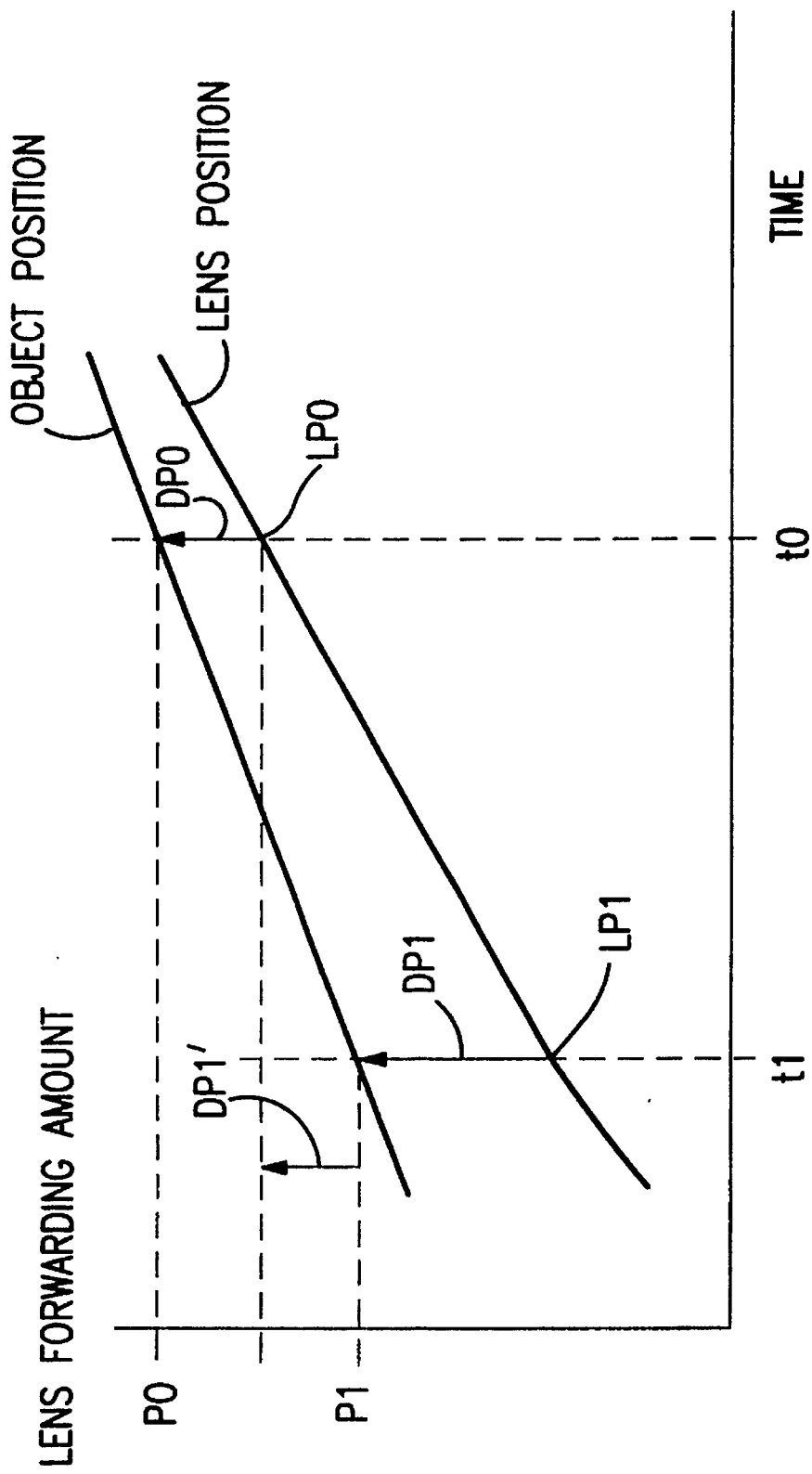
FIG. 12 is a graphical representation showing the image plane position versus time for the image plane movement velocity calculation according to the invention.

The calculation for the image movement velocity and focus position change velocity will be explained with reference to FIG. 12. Defocus amounts cannot be added or subtracted because a defocus amount is an amount from the relative position to the determined image plane of the object, when viewed from a predetermined imaging plane. Further, defocus amounts cannot be added or subtracted because a defocus amount is not proportional to the lens movement, but varies with the lens position. Thus, in order to calculate the image plane movement velocity, the stored central time object position relative value DP1' for the previous time is first calculated according to the following Equation (5).

$$DP1'=P1-LP0 \quad (5)$$

where P1 is the object target position for the previous time.

Next, the relative value DP1' is converted by Equation (6) to the corresponding previous time's central time of accumulation defocus amount DF1', using the defocus amount lens drive amount conversion coefficients.

$$DF1'=DP1'/\{(KB*KL)+(DP1'*L)\} \quad (6)$$

The image plane movement velocity S0, for the time interval between the previous time and the current time, will then be determined from Equation (7) using the current time's defocus amount DF0 and the previous time's central time of accumulation defocus amount DF1', viewed from the current time central time of accumulation lens position.

$$S0=(DF0-DF1')/(t0-t1) \quad (7)$$

To combine defocus amounts from multiple areas, the current time defocus amount DF0 is converted, using the defocus amount lens movement amount conversion coefficients. In cases where there are not multiple focus detection areas or there are multiple focus detection areas where the accumulation start and stop coincide, it is not necessary to calculate the relative object position and then reversely calculate the defocus amount.

The focus position change velocity calculation is explained with reference to FIG. 12. In FIG. 12, DP0 and DP1 are lens movement amounts and LP1 is an average lens position. The focus position change velocity SP0 is the velocity of the focus lens position change per time unit and is calculated from Equation (8).

$$SP0=(P0-P1)/(t0-t1) \quad (8)$$

where P1 is the lens position at the previous time's central time of accumulation t1, and P0 is the lens position at the present central time of accumulation t0. The image plane movement velocity and focus position change velocity are calculated using the current and previous times' focus detection results. However, it is also possible to use the focus detection results of the current time and the time preceding the immediately previous time to calculate the image plane movement velocity.

The controller 7 then moves from step S301 to step S302. In step S302, it is determined whether the directions for the current time image plane movement velocity S0 and the previous time image plane movement velocity S1 are opposite. If the directions are opposite, the object will not be recognized as a moving object because the object has 1) either left the focus detection area and another object was detected with a reversed motion, or 2) the object was not appropriate for the calculation. The controller 7 moves to step S307 if the directions are opposite.

The controller 7 moves to step S303 if the directions are not opposite. In step S303, it is determined whether the current time image plane movement velocity S0 is greater than a fixed value Sth. If the current time image plane movement velocity S0 is less than the fixed value Sth, the controller 7 determines that the object is not a moving object and proceeds to step S307.

However, if the controller 7 at step S303 determines that the object is a moving object, the controller 7 then moves to step S304. In step S304, the ratio of the present time's image plane movement velocity S0 and the previous time's image plane movement velocity S1 is calculated. Also in step S304, it is determined whether the ratio S0/S1 is within a predetermined range. If the ratio S0/S1 is within a determined range, the results of the focus detection for the present time are determined to be reliable. The controller 7 then proceeds to step S305.

In step S305, a moving object flag is set designating the object as a currently moving object. The controller 7 then moves to step S306, where the focus position change velocity SP0 is substituted for lens movement target velocity VP0. SP0 is used in the actual lens control.

If the ratio S0/S1 is outside the predetermined range, the controller 7 determines that the object has left the focus detection area and that another object was detected. Thus, the controller 7 proceeds to step S307 and determines whether the object is moving.

However, if the ratio S0/S1 is not within the predetermined range, the controller 7 moves to step S307, which clears a moving object flag, because the object cannot be determined to be moving or because the object is stationary. From step S307, the controller 7 moves to step S308 where the lens movement target velocity VP0 for lens control is set to 0.

Figure 13:
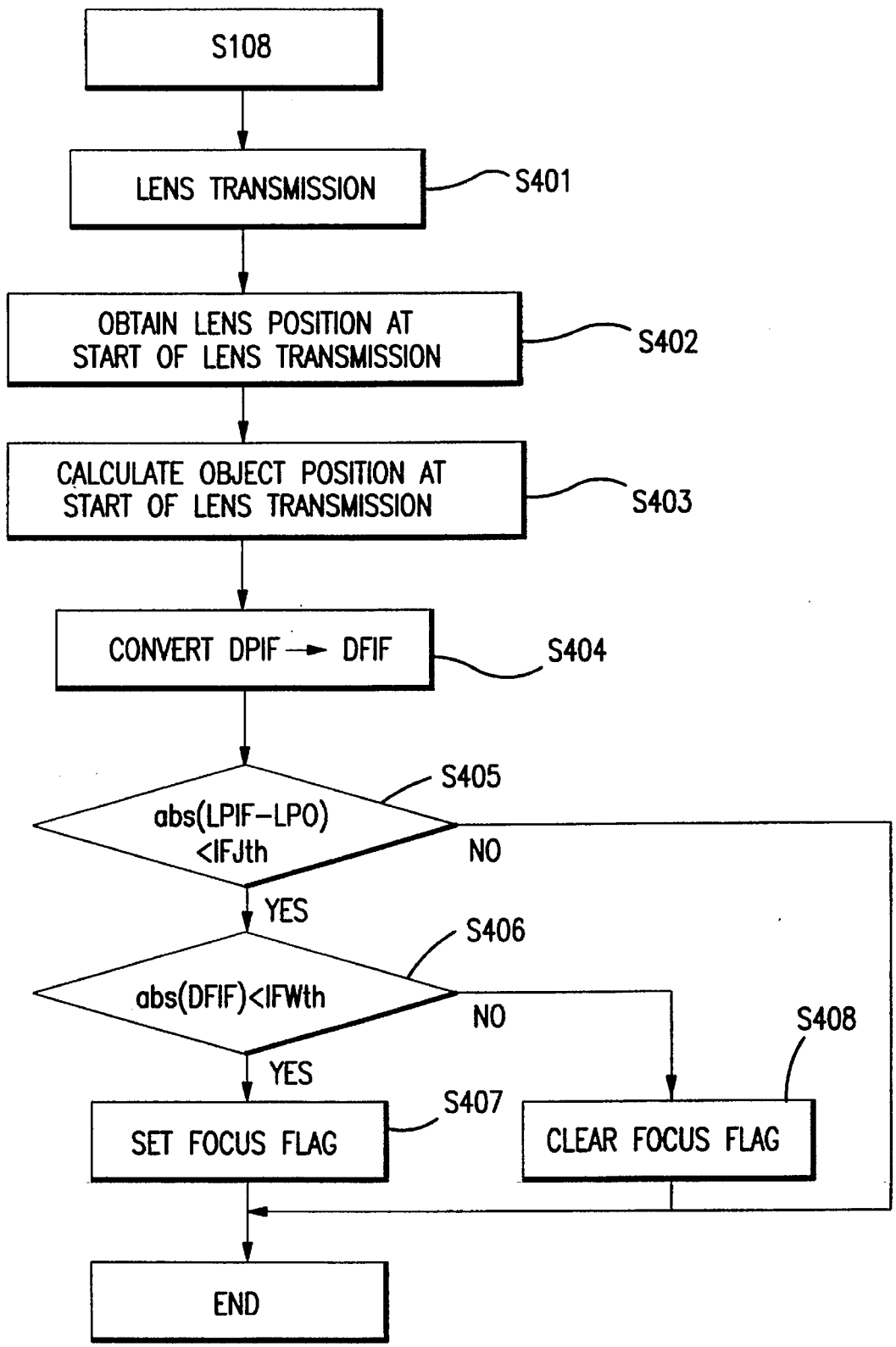
FIG. 13 is a flow chart illustrating the focus determination control subroutine according to the invention.
Figure 14:
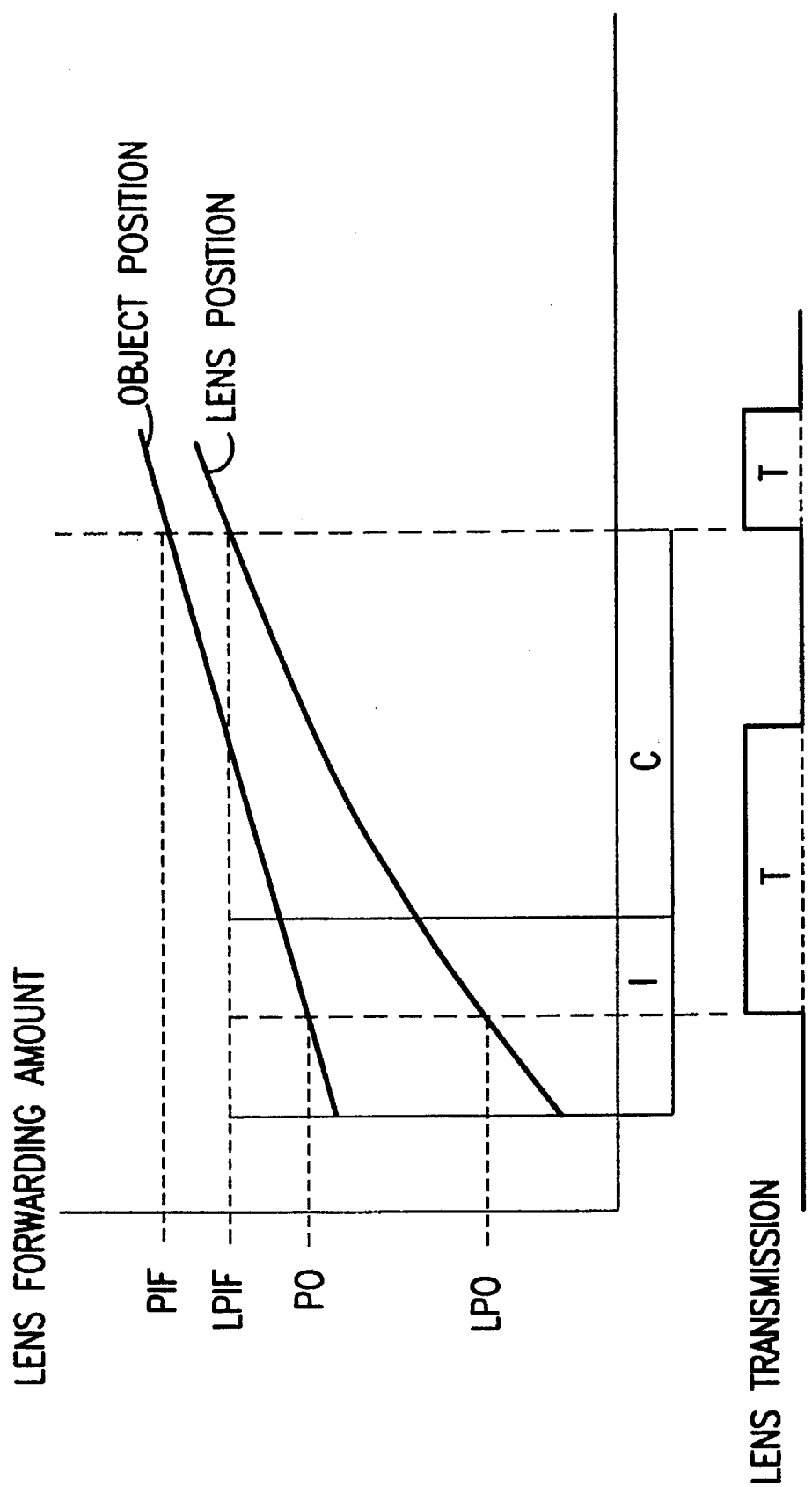
FIG. 14 is a graphical representation of lens position versus time used in focus determination.

Next the focus determination control subroutine at step S108 and the defocus amount DFIF calculation, which is used in the focus determination control subroutine, is explained with reference to FIGS. 13 and 14. In FIG. 14, T indicates the time for lens transmission or exchange of data between the camera body and the lens, I indicates the photoelectric conversion element accumulation time, and C indicates the focus detection calculation operation time.

The focus determination controller 7 starts at step S401, which uses the defocus amount lens movement amount conversion coefficient, obtained at lens transmission, to calculate the defocus amount for the focus detection. These coefficients are needed for each lens; therefore, the defocus amount lens movement amount conversion coefficient will change with each lens and according to the lens position. At step S402, the lens position LPIF at the starting time of lens transmission is obtained. In step S403, object position PIF at the starting time of lens transmission is calculated, using Equation (9).

$$PIF=VPO*(tIF-t0)+P0 \qquad (9)$$

where tIF is the time at step S401, the start of lens data transmission. Further, in step S402, the remaining drive amount DPIF at the time of focus judgment is calculated using Equation (10).

$$DPIF=PIF-LPIF \qquad (10)$$

The defocus amount DFIF at the time of focus judgment is then determined from Equation (11) in step S404.

$$DFIF=DPIF/((KB*KL)+(DPIF*L)) \qquad (11)$$

where DPIF is the remaining drive amount at the time of lens data exchange. The defocus amount lens drive amount conversion coefficients were obtained at step S401. Next, the controller 7 at step S405 determines whether the lens movement amount from the present central time of accumulation to the focus judgment time is less than a fixed value, IFJth. If the lens movement amount is larger than the fixed value, focus determination will not be performed, because erroneous focus determinations can be caused when the lens movement amount is large.

If the focus amount DPIF is less than the fixed value IFJth, the controller 7 then moves to step S406. In step S406 it is determined whether the defocus amount at time of focus judgment DFIF is within a predetermined focus width IFWth. If the defocus amount DPIF is within the focus width IFWth, the controller 7 proceeds to step S407, where a focus flag is set. If the defocus amount DPIF is not within the focus width IFWth, the controller 7 proceeds to step S408, where the focus flag is cleared.

Figure 15:
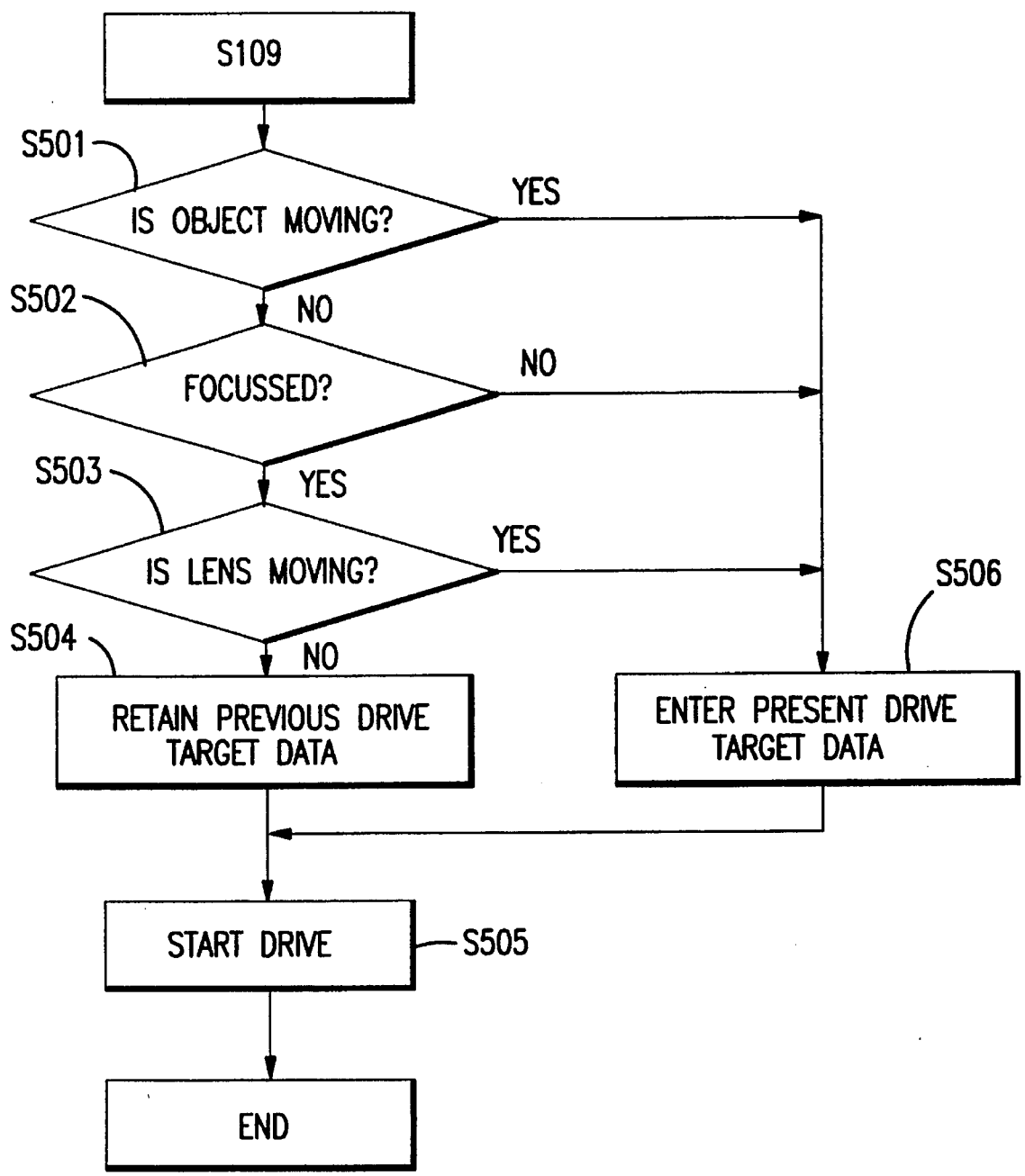
FIG. 15 is a flow chart showing the lens drive control subroutine according to the invention.

The lens drive control subroutine at step S109 will be explained with reference to FIG. 15. The lens drive control subroutine starts at step S501, where the presence of a moving object is determined from a moving object flag. If it is determined that the object is moving at step S501, the controller 7 enters the currently calculated drive target data because the lens drive movement will not stop according to the focus determination. The drive target data is determined from the object position P0, current central time of accumulation and the lens movement target velocity VP0 for this accumulation. If the object is not a moving object, the controller 7 moves to step S502 where it is determined if the object can be focussed upon at the present time.

However, if the object is determined to be in focus, the controller 7 proceeds to step S503 where, if the object is determined to be in motion, the amount of motion is added to the currently calculated drive target data in step S506. Also, if the lens is currently being driven, even if it is within the focus width, the lens will not be immediately stopped, but will continue to be driven until the defocus amount equals 0.

If the lens is not currently being driven, no lens drive amount will be added to the current drive target. The previous drive target will be retained, in step S504 and a further lens will not be required. The controller 7 thus moves to step S505, and the actual lens driving based on the calculated drive target data is started in step S505.

The exact determination of an object's movement can be achieved because image plane movement velocity is used in determining if the object is moving. However, the image plane movement velocity, used in determining whether the object is moving, is not used in the lens drive control, which also permits the exact determination of the object's movement. Also, a more precise image plane movement velocity can be obtained because the object's image plane movement velocity is calculated based on a fixed lens, instead of the non-fixed lens image plane movement velocity calculation that is used in known autofocus systems.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An autofocus adjustment device of a camera for focusing on an image, comprising:

a shooting lens that is movable to focus an image of an object;

a focus detector that detects a defocus amount DF of the shooting lens;

a monitor that monitors a movement amount of the shooting lens;

a timer that measures a time required by the focus detector to detect a defocus amount;

a memory that stores data including a time measurement to detect a defocus amount, the movement amount, and the defocus amount;

an image plane movement velocity calculator that calculates an image plane movement velocity S0 based on data stored in the memory;

a movement determining device that determines whether the object is moving based upon the image plane movement velocity calculator; and a control that controls lens movement, wherein the movement determining device uses the image plane movement velocity S0 to determine whether the object is moving, and wherein the control uses a focus position change velocity SP0 to change speeds of lens movement as the lens moves, the image plane movement velocity S0 is determined by $$S0=(DF0-DF1')/(t0-t1)$$

where DF0 is a current time's t0 central time of accumulation defocus amount and DF1' is a previous time's t1 central time of accumulation defocus amounts, the focus position change velocity SP0 is determined by $$SP0=(P0-P1)/(t0-t1)$$

where P0 is a lens position at the current central time of accumulation and P1 is a lens position at the previous central time of accumulation.

2. The device according to claim 1, further comprising:

an object movement detector that detects whether the object is moving, the object movement detector comprising a shooting lens position detector that detects position of the shooting lens at a first time;

a focus adjustment state detector that detects a focus adjustment state of the lens on the object at a first time;

a modifier that changes the focus adjustment state and shooting lens position to focus on the object at the first time, wherein the position detector also detects the position of the shooting lens at a second time, the second time being a predetermined time after the first time, the position detector also detecting the focus adjustment state and shooting lens position of the lens at the second time, wherein the modifier also changes a forwarding amount and the shooting lens position detected at the first time to the focus adjustment state and the position of the shooting lens at the second time; and an image plane movement velocity calculator that calculates the image plane movement velocity based on the focus adjustment state and the shooting lens position at the second time.

3. The device according to claim 2, wherein the focus adjustment state is the defocus amount of the shooting lens.

4. The device according to claim 2, further including a photoelectric conversion element, wherein the focus adjustment state is achieved by controlling accumulation time of the photoelectric conversion element, wherein the first time and the second time are central accumulation times of the photoelectric conversion element.

5. The device according to claim 1, further comprising an object movement detector for detecting whether the object is moving, the object movement detector comprising a shooting lens position detector that detects the shooting lens position at a first time;

a focus adjustment state detector that detects a focus adjustment state of the shooting lens on the object at the first time;

a modifier that changes the focus adjustment state and shooting lens position of the shooting lens; wherein the shooting lens position detector also detects the position of the shooting lens at a second time, wherein the second time is a predetermined time after the first time, wherein the focus adjustment detector detects the focus adjustment state and shooting lens position at the second time, and wherein the modifier also changes a forwarding amount and the shooting lens position detected at the first time to the focus adjustment state and the position of the shooting lens at the second time; and an image plane movement velocity calculator that calculates the image plane movement velocity based on the focus adjustment state and the shooting lens position at the second time.

6. The device according to claim 5, wherein the focus adjustment state is the defocus amount of the shooting lens.

7. The device according to claim 5, further including a photoelectric conversion element, wherein the focus adjustment state is achieved by controlling accumulation time of the photoelectric conversion element, wherein the first time and the second time are central accumulation times of the photoelectric conversion element.

8. An autofocus adjustment device of a camera for focusing on an image, comprising:

a shooting lens that is movable to focus an image of an object;

means for detecting a defocus amount DF of the shooting lens;

means for monitoring a movement amount of the shooting lens;

means to measure a time required by the focus detecting means to detect a defocus amount;

means for storing data including a time measurement to detect a defocus amount, the movement amount, and the defocus amount;

means for calculating an image plane movement velocity S0 based on data stored by the storing means;

movement determination means for determining whether the object is moving based upon the image plane movement velocity calculating means; and means for controlling lens movement based on the data from the storing means; wherein the movement determining means uses the image plane movement velocity S0 to determine whether the object is moving, and the lens driving means uses a focus position change velocity SP0 to change speeds of the lens as the lens moves, the image plane movement velocity S0 is determined by $$S0=(DF0-DF1')/(t0-t1)$$

where DF0 is a current time's t0 central time of accumulation defocus amount and DF1' is a previous time t1 central time of accumulation defocus amount, the focus position change velocity SP0 is determined by $$SP0=(P0-P1)/(t0-t1)$$

where 0 is a lens position at the current central time of accumulation and P1 is a lens position at the previous central time of accumulation.

9. The autofocus adjustment device according to claim 8, further comprising:

an object movement detection means for detecting whether the object is moving, the object movement detection means comprising means for detecting the position of the shooting lens at a first time;

means for detecting the focus adjustment state and shooting lens position at a first time;

means for changing the focus adjustment state and the shooting lens position to a forwarding amount;

means for detecting the position of the shooting lens at a second time, when the second time is a predetermined time after the first time;

means for detecting the focus adjustment state and the shooting lens position at the second time; wherein the means for changing the forwarding amount and the shooting lens position to the focus adjustment state and shooting lens position at the second time; and means for calculating an image plane movement velocity based on the object position focus adjustment state and the shooting lens position at the second time.

10. The device according to claim 9, wherein the focus adjustment state is the defocus amount of the shooting lens.

11. The device according to claim 9, further including a photoelectric conversion means, wherein the focus adjustment state is achieved by controlling accumulation time of the photoelectric conversion means, wherein the first time and the second time are central accumulation times of the photoelectric conversion means.

12. The autofocus adjustment device according to claim 8, further comprising:

an object movement detection means for detecting whether the object is moving, the object movement detection means comprising means for detecting the shooting lens position at a first time;

means for detecting the focus adjustment state and the shooting lens position at the first time;

means for changing the focus adjustment state and the shooting lens position to a forwarding amount;

means for detecting the focus adjustment state and the position of the shooting lens at a second time, wherein the second time is a predetermined time after the first time;

means for changing the forwarding amount and the shooting lens position detected in the first time to the shooting lens position and the focus adjustment state at the second time; and means for calculating the image plane movement velocity based on the shooting lens position and the focus adjustment state at the second time.

13. The autofocus adjustment device according to claim 12, wherein the focus adjustment state is in the defocus amount of the shooting lens.

14. The autofocus adjustment device according to claim 12, further including photoelectric conversion means, wherein the focus adjustment state is achieved by controlling accumulation time of the photoelectric conversion means, wherein the first time and the second time are he central accumulation times of the photoelectric conversion means.

15. An autofocus adjustment method for focusing on an image, the method comprising the steps of:

detecting a defocus amount of a shooting lens on an image of an object;

monitoring a movement amount of the shooting lens;

measuring a time required by the focus detector to detect a defocus amount DF;

storing data including a measurement to detect a defocus amount, the movement amount, and the defocus amount;

calculating an image plane movement velocity based on the data stored in the storing step;

determining whether of the object is moving based upon the image plane movement velocity calculating step; and controlling lens movement such that the movement determining step uses the image plane movement velocity S0 to determine the movement of the object, said controlling using a focus position change velocity SP0 to change speeds of lens movement as the lens moves, the image plane movement velocity S0 is determined by $$S=(DF0-DF1')/(t0-t1)$$

where DF0 is a current time's t0 central time of accumulation defocus amount and DF1' is a previous time t1 central time of accumulation defocus amount, the focus position change velocity SP0 is determined $$SP0=(P0-P1)/(t0-t1)$$

where P0 is a lens position at the current central time of accumulation and P1 is a lens position at the previous central time of accumulation.

16. The method according to claim 15, further comprising:

detecting whether the object is moving and detecting the position of the shooting lens at a first time;

detecting a focus adjustment state of the lens on the object at a first time;

changing the focus adjustment state and shooting lens position to a forwarding amount to focus on the object at the first time;

detecting the position of the shooting lens at a second time, wherein the second time is a predetermined time after the first time;

detecting the focus adjustment state and shooting lens position of the lens at the second time;

changing the forwarding amount and the shooting lens positions detected in the first time to the focus adjustment state and the position of the shooting lens at the second time; and calculating the image plane movement velocity based on the focus adjustment state and the shooting lens position at the second time.

17. The method according to claim 16, wherein the focus adjustment state is the defocus amount of the shooting lens.

18. The method according to claim 16, further including a photoelectric conversion element, wherein the focus adjustment state is achieved by controlling accumulation time of the photoelectric conversion element, wherein the first time and the second time are central accumulation times of the photoelectric conversion element.

19. The method according to claim 15, further comprising the steps;

detecting whether the object is moving;

detecting the shooting lens position at a first time;

detecting a focus adjustment state of the shooting lens on the object at the first time;

changing the focus adjustment state and shooting lens position of the shooting lens to a forwarding amount;

detecting the position of the shooting lens at a second time, wherein the second time is a predetermined time after the first time;

detecting the focus adjustment state and shooting lens position at the second time;

changing the forwarding amount and the shooting lens position detected in the first time to the focus adjustment state and the position of the shooting lens at the second time; and calculating the image plane movement velocity based on the focus adjustment state and the shooting lens position at the second time.

20. The device according to claim 19, wherein the focus adjustment state is the defocus amount of the shooting lens.

21. The device according to claim 19, further including a photoelectric conversion element, wherein the focus adjustment state is achieved by controlling accumulation time of the photoelectric conversion element, wherein the first time and the second time are central accumulation times of the photoelectric conversion element.

* * * * *